United States Patent
Chen et al.

(10) Patent No.: US 8,817,204 B2
(45) Date of Patent: Aug. 26, 2014

(54) LIQUID CRYSTAL DISPLAY AND LIQUID CRYSTAL DISPLAY DEVICE INCLUDING THE SAME

(75) Inventors: Shih-Hsiang Chen, Shenzhen (CN); Jiahe Cheng, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 135 days.

(21) Appl. No.: 13/515,241

(22) PCT Filed: Apr. 17, 2012

(86) PCT No.: PCT/CN2012/074160
§ 371 (c)(1),
(2), (4) Date: Jun. 11, 2012

(87) PCT Pub. No.: WO2013/127118
PCT Pub. Date: Sep. 6, 2013

(65) Prior Publication Data
US 2013/0271693 A1    Oct. 17, 2013

(51) Int. Cl.
*G02F 1/1333*    (2006.01)

(52) U.S. Cl.
USPC .................................................. 349/58

(58) Field of Classification Search
CPC ......... G02F 2001/133314; G02F 2001/133328
USPC ........................................................ 349/58
See application file for complete search history.

(56) References Cited

U.S. PATENT DOCUMENTS

| | | | | |
|---|---|---|---|---|
| 6,549,263 | B1 * | 4/2003 | Kim | 349/58 |
| 7,369,190 | B2 * | 5/2008 | Park | 349/58 |
| 7,460,194 | B2 * | 12/2008 | Tsukamoto | 349/60 |
| 7,545,458 | B2 * | 6/2009 | Hsu et al. | 349/58 |
| 7,768,775 | B2 * | 8/2010 | Kim | 361/679.27 |
| 8,576,551 | B2 * | 11/2013 | Oh et al. | 361/679.21 |
| 2006/0092345 | A1 | 5/2006 | Takeuchi | |

FOREIGN PATENT DOCUMENTS

| | | |
|---|---|---|
| CN | 101620339 | 1/2010 |
| CN | 201477322 | 5/2010 |
| CN | 102096218 | 6/2011 |
| CN | 102169245 | 8/2011 |
| CN | 201935066 | 8/2011 |

* cited by examiner

*Primary Examiner* — James Dudek
(74) *Attorney, Agent, or Firm* — Muncy, Geissler, Olds & Lowe, P.C.

(57) ABSTRACT

Provided is a liquid crystal display device including: a base; a liquid crystal display including a plastic frame having a first supporting surface and a second supporting surface; a backlight unit disposed on the first supporting surface; a liquid crystal panel disposed on the second supporting surface; and a plurality of holding components disposed at outer sides of the plastic frame, respectively, for keeping the backlight unit, the plastic frame and the liquid crystal panel in their relative positions to each other; a support frame disposed between the base and the liquid crystal display; and a PCB electrically connected to the liquid crystal display through a wire, and being disposed at a vertical plane of the support frame.

8 Claims, 5 Drawing Sheets

LIQUID CRYSTAL DISPLAY AND LIQUID CRYSTAL DISPLAY DEVICE INCLUDING THE SAME

FIELD OF THE INVENTION

The present invention relates to a liquid crystal display device, and more particularly to a liquid crystal display device having an external printed circuit board (PCB).

BACKGROUND OF THE INVENTION

With the development of the video technology, liquid crystal displays are largely used in various consumer electronics including mobile phones, laptops, personal computers, and PDAs (Personal Digital Assistants). Besides, liquid crystal display has became mainstream of the display field due to its light weight, small size, low operating voltage, low power, and low radiation.

FIG. 1 illustrates a backboard of a liquid crystal display according to the prior art. The liquid crystal display of the prior art includes hanging holes 110, which are used for hanging the device on the wall, positioned at center of a backboard 130; and a PCB (printed circuit board) 120 disposed at the center and right side of the backboard 130.

FIG. 2 illustrates a liquid crystal display device according to the prior art. The liquid crystal display device includes a base 150; a support frame 140; a liquid crystal display 160; and a PCB 120. The support frame 140 is disposed between the base 150 and the liquid crystal display 160 to hold and secure the base 150 and the liquid crystal display 160, thereby allowing the liquid crystal display 160 to stand steadily on a plane surface. The PCB 120 is positioned at the center and the right side of the liquid crystal display 160.

The liquid crystal display according to the prior art has limitations as described below. As shown in FIGS. 1 and 2, the backboard 130 of the liquid crystal display 160 is essential for employing the hanging holes 110 and the PCB 120. Further, more convex hulls and screw holes are needed on the backboard 130 for locking the screws, leading to a higher difficulty in manufacturing the liquid crystal display 160. Moreover, front frame, plastic frame and backboard are required for holding the liquid crystal panel and the backlight unit together during the assembly of the liquid crystal display, resulting in higher manufacturing cost. Referring to FIGS. 1 and 2, providing the backboard 130 with the PCB 120 thereon makes the liquid crystal display 160 thicker, which deviates the slim trend of the liquid crystal displays.

Thus, a liquid crystal display that can be easily manufactured, has reduced manufacturing cost, and is slimmed is proposed to solve the foregoing problems.

SUMMARY

In order to overcome the deficiencies of the prior art, one objective of the present invention provides a liquid crystal display without backboard, which can be easily manufactured, has reduced manufacturing cost, and is slimmed.

Another objective of the present invention overcomes the deficiencies of the prior art, and provide a liquid crystal display device without backboard, which can be easily manufactured, has reduced manufacturing cost, and is slimmed.

With the above objective in mind, the present invention provides a liquid crystal display including: a plastic frame having a first supporting surface and a second supporting surface; a backlight unit disposed on the first supporting surface; a liquid crystal panel disposed on the second supporting surface; and a plurality of holding components disposed at outer sides of the plastic frame, respectively, for keeping the backlight unit, the plastic frame and the liquid crystal panel in their relative positions to each other.

The holding components of the liquid crystal display are four bar-shaped components, forming a rectangular shape.

The liquid crystal display further includes four hanging holes disposed at four corners of the rectangle formed by the holding components, wherein the hanging holes are used to hang the liquid crystal display on the wall.

The liquid crystal display includes four holding components disposed at the outer sides of the plastic frame, respectively; wherein two of the holding components are disposed at long sides, and other two are disposed at short sides.

The plastic frame of the liquid crystal display is stepped shape.

With the above objective in mind, the present invention further provides a liquid crystal display device including: a base; a liquid crystal display including a plastic frame having a first supporting surface and a second supporting surface; a backlight unit disposed on the first supporting surface; a liquid crystal panel disposed on the second supporting surface; and a plurality of holding components disposed at outer sides of the plastic frame, respectively, for keeping the backlight unit, the plastic frame and the liquid crystal panel in their relative positions to each other; a support frame disposed between the base and the liquid crystal display; and a PCB electrically connecting to the liquid crystal display through a wire, and is attached to the liquid crystal display externally.

The liquid crystal display device further includes a non-display surface, wherein four corners of the non-display surface are provided with hanging holes for hanging the liquid crystal display on the wall.

The support frame of the liquid crystal display device further includes a protective cover disposed on the vertical plane of the support frame, wherein the PCB is accommodated inside the protective cover and protected by the protective cover.

The holding components of the liquid crystal display device are four bar-shaped components, forming a rectangular shape.

The holding components of the liquid crystal display device are four bar-shaped components disposed at the outer sides of the plastic frame respectively, and form a rectangular shape; wherein two of the holding components are disposed at long sides, and other two are disposed at short sides.

The liquid crystal display device further includes at least four hanging holes disposed at four corners of the rectangle formed by the holding components, wherein the hanging holes are used to hang the liquid crystal display on the wall.

As the foregoing, the liquid crystal display device provided by the present invention has an advantageous effect in that the production efficiency is increased since the structure design makes the assembling process easier. Without the backboard, front frame of the prior art, and by attaching the PCB externally, the manufacturing of the liquid crystal display device may achieve a lower cost and a miniaturized design.

The previous description of the present invention is only a schematic and brief illustration provided to enable a better understanding of the technical solution of the invention and to practice the invention according to the description of the present invention. Hereinafter, the preferred embodiment of the present invention will be described in detail with reference to the accompanying drawings.

DETAILED DESCRIPTION OF THE EMBODIMENTS

Now, the preferred embodiment of the present invention will be described in detail with reference to the accompanying drawings.

Figure 4:
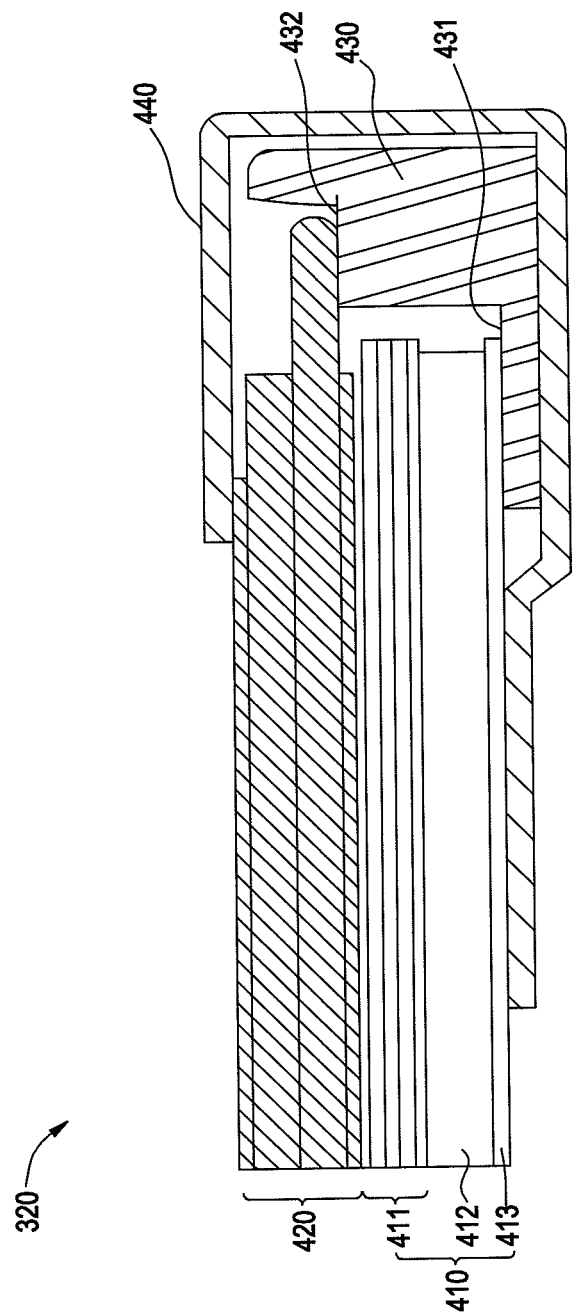
FIG. 4 is a sectional view of the liquid crystal display according to the preferred embodiment of the present invention.

FIG. 4 is a sectional view of a liquid crystal display according to the preferred embodiment of the present invention. The liquid crystal display 320 is a backboard-free liquid crystal display. The liquid crystal display 320 includes a plastic frame 430, a backlight unit 410, a liquid crystal panel 420, and a holding component 440. The plastic frame 430 is stepped shape. The plastic frame 430 includes a first supporting surface 431 and a second supporting surface 432. The backlight unit 410 includes a reflective sheet 413, a light guide plate 412 and an optical film set 411.

The backlight unit 410 is disposed on the first supporting surface 431 of the plastic frame 430. The liquid crystal panel 420 is disposed on the second supporting surface 432 of the plastic frame 430. The holding component 440 is disposed at outer sides of the plastic frame 430 to keep the backlight unit 410, the plastic frame 430 and the liquid crystal panel 420 in their relative positions to each other.

The backlight unit 410 has a structure in which the light guide plate 412 is arranged between the reflective sheet 413 and optical film set 411, allowing the light output from the light guide plate 412 to pass through the optical film set 411 and becoming a planar light source. For instance, the optical film set 411 may include diffusion sheet, prism sheet, and brightness enhanced sheet in sequence from bottom to top.

During assembly process, the reflective sheet 413, the light guide plate 412 and the optical film set 411 are disposed on the first supporting surface 431 of the plastic frame 430 sequentially, and then the liquid crystal panel 420 is disposed on the second supporting surface 432. Then, the holding component 440 assembles the reflective sheet 413, the light guide plate 412, the optical film set 411 and the liquid crystal panel 420 from the outside of the plastic frame 430. After that, the reflective sheet 413, the light guide plate 412, the optical film set 411, the liquid crystal panel 420, the plastic frame 430, and above-mentioned components are hold in their relative positions to each other by locking the screws.

Figure 5:
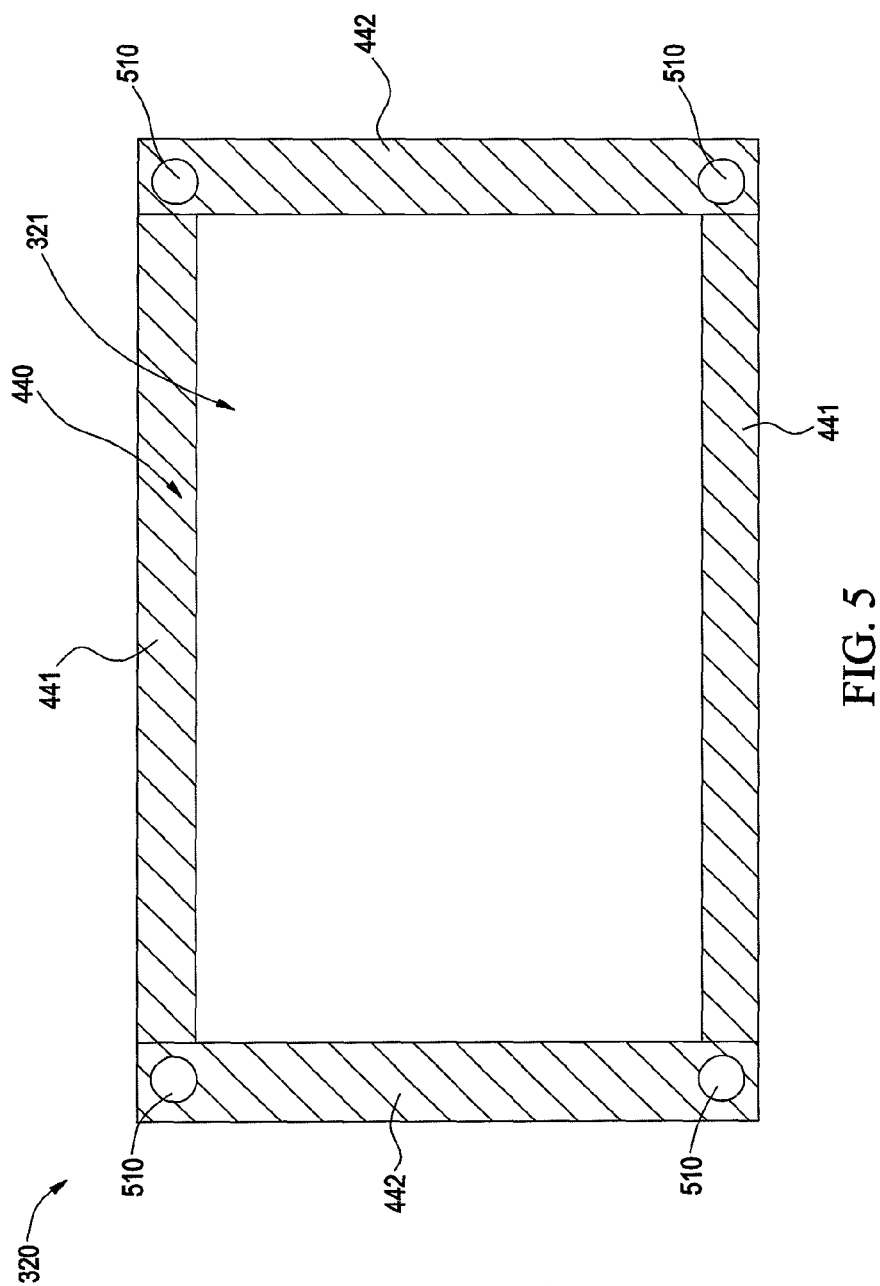
FIG. 5 is an illustration of a non-display surface of the liquid crystal panel according to the preferred embodiment of the present invention.

FIG. 5 is an illustration of a non-display surface of the liquid crystal panel according to the preferred embodiment of the present invention. A non-display surface 321 of the liquid crystal panel 320 includes a plurality of holding components 440 and a plurality of hanging holes 510. The preferred embodiment of the present invention is to dispose four holding components 440 at the outside of the liquid crystal panel 320, and, as shown in FIG. 4, use screws to secure components including the plastic frame 430, the backlight unit 410, and the liquid crystal panel 420 by the holding components 440. Two of the four holding components 440 are disposed at long sides, and other two of the four holding components 440 are disposed at short sides. The four holding components 440 are disposed at the outer sides of the plastic frame 430 respectively, thereby forming a rectangular shape. Hanging holes 510 are disposed at four corners of the rectangle formed by the holding components 440, wherein the hanging holes 510 may be used with a hanging frame in order to hang the liquid crystal display 320 on the wall.

Another embodiment of the present invention includes two L-shaped holding components or two frame-shaped holding components disposed at the outside of the liquid crystal display 320, and engage with each other in corresponding directions of the liquid crystal display. Wherein, the structure and assembly method of the liquid crystal display 320 is the same as described above.

Figure 1:
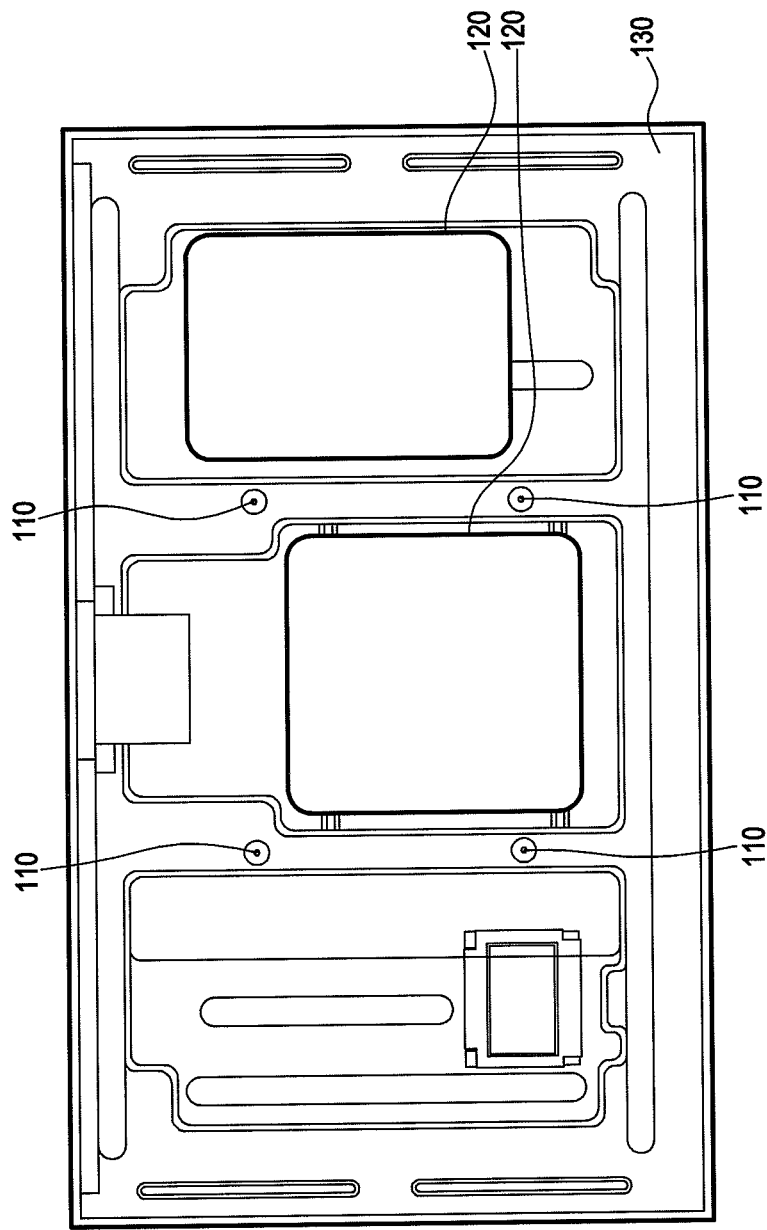
FIG. 1 illustrates a backboard of a liquid crystal display according to prior art.
Figure 2:
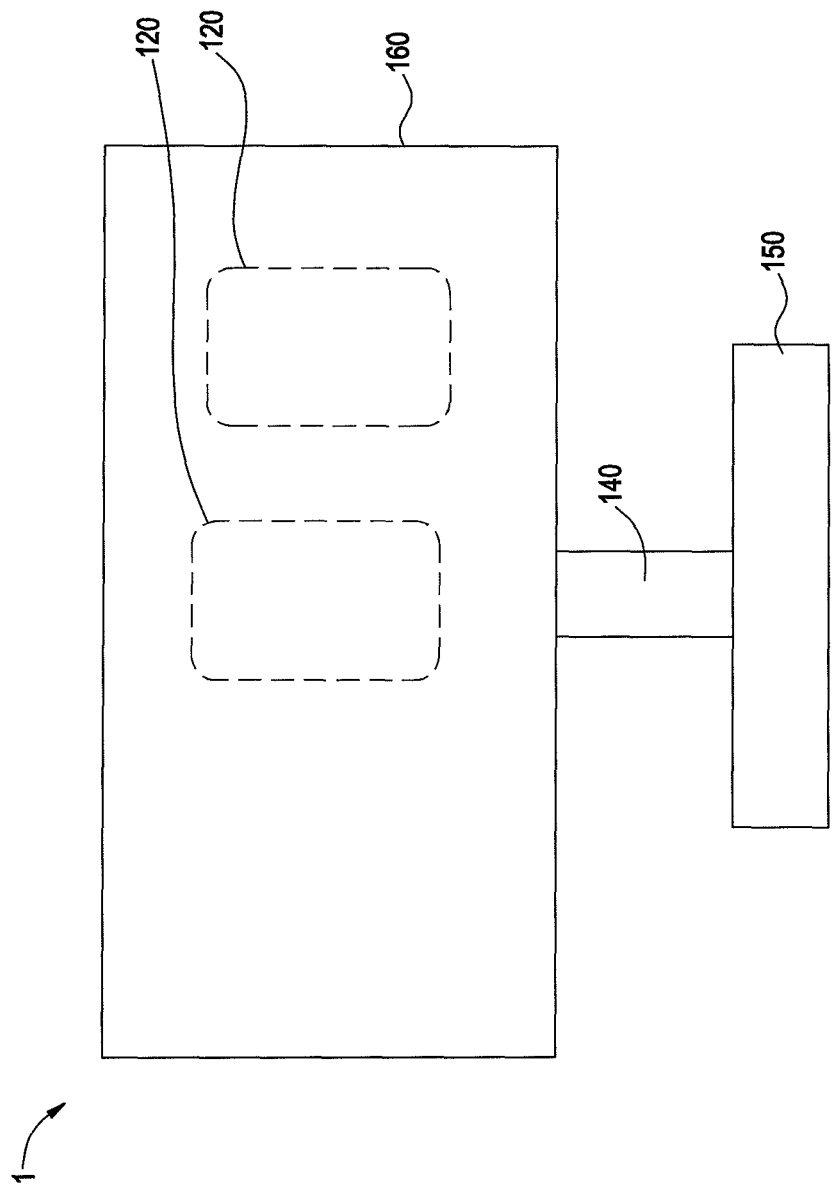
FIG. 2 illustrates a liquid crystal display device according to prior art.
Figure 3:
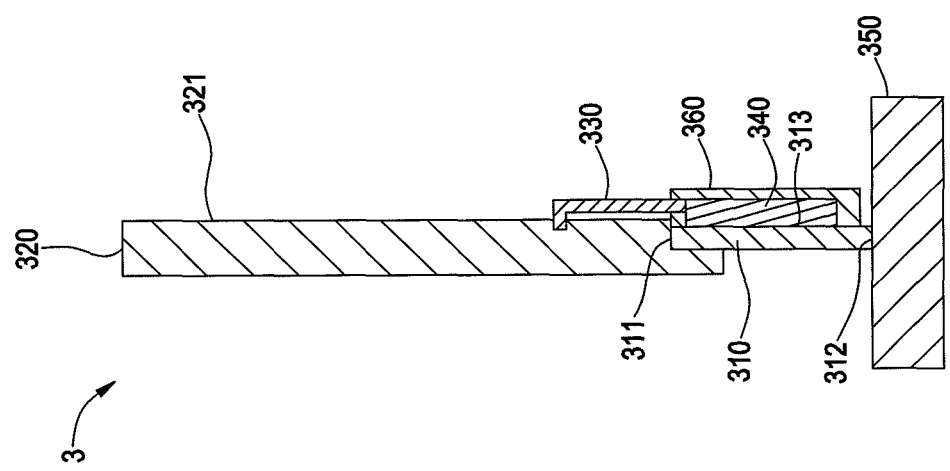
FIG. 3 is a structural view of a liquid crystal display device according to the preferred embodiment of the present invention.

FIG. 3 is a structural view of a liquid crystal display device according to the preferred embodiment of the present invention. A liquid crystal display device 3 includes: a base 350; a liquid crystal display 320; a support frame 310; a PCB 340; a wire 330; and a protective cover 360. Wherein, the liquid crystal display 320 further includes a non-display surface 321.

The support frame 310 is disposed between the base 350 and the liquid crystal display 320. The support frame 310 includes a top end 311 and a bottom end 312. The top end 311 is connected to the liquid crystal display 320, and the bottom end 312 is connected to the base 350.

The wire 330 extends from the non-display surface 321 of the liquid crystal display 320. The PCB 340 is electrically connected to the liquid crystal display 320 through the wire 330. The PCB 340 controls the driving circuit, control circuit and power supply circuit of the liquid crystal display 320, and not limited thereto. The protective cover 360 is disposed at a vertical plane 313 of the support frame 310, wherein the PCB is accommodated inside the protective cover 360. The vertical plane 313 and the non-display surface 321 are disposed at the same side in the present invention.

As the foregoing, the liquid crystal display device provided by the present invention has an advantageous effect in that the production efficiency is increased since the structure design makes the assembling process easier. Without the backboard, front frame of the prior art, and by attaching the PCB externally, the manufacturing of the liquid crystal display device may achieve a lower cost and a miniaturized design.

The previous description of the preferred embodiment is provided to further describe the present invention, not intended to limit the present invention. Any modification apparent to those skilled in the art according to the disclosure within the scope will be construed as being included in the present invention.

What is claimed is:

1. A liquid crystal display comprising:
   a plastic frame having a first supporting surface and a second supporting surface;
   a backlight unit disposed on the first supporting surface;
   a liquid crystal panel disposed on the second supporting surface; and
   a plurality of holding components disposed at outer sides of the plastic frame, respectively, for keeping the backlight unit, the plastic frame and the liquid crystal panel in their relative positions to each other; the holding components of the liquid crystal display device being four bar-shaped components, forming a rectangular shape, and disposed at the outer sides of the plastic frame respectively, wherein two of the holding components are disposed at long sides, and other two are disposed at short sides; and at least four hanging holes disposed at four corners of the rectangle formed by the holding components, wherein the hanging holes are used to hang the liquid crystal display on a wall.

2. The liquid crystal display of claim 1, wherein the plastic frame is stepped shape.

3. A liquid crystal display device comprising:
a base;
a liquid crystal display according to claim 1;
a support frame disposed between the base and the liquid crystal display; and
a PCB electrically connected to the liquid crystal display through a wire, and is attached to the liquid crystal display externally.

4. The liquid crystal display device of claim 3, wherein the liquid crystal display further comprises a non-display surface, and four corners of the non-display surface are provided with hanging holes for hanging the liquid crystal display on the wall.

5. The liquid crystal display device of claim 3, wherein the support frame further comprises a protective cover disposed at a vertical plane of the support frame, wherein the PCB is accommodated inside the protective cover and protected by the protective cover.

6. The liquid crystal display device of claim 3, wherein the holding components are four bar-shaped components, forming a rectangular shape.

7. The liquid crystal display device of claim 3, wherein the holding components are four bar-shaped components disposed at the outer sides of the plastic frame respectively, forming a rectangular shape; wherein two of the holding components are disposed at long sides, and other two of the holding components are disposed at short sides.

8. A liquid crystal display comprising:
a plastic frame having a base block, a first protrusion protruded from the base block, and a second protrusion protruded from the first protrusion, wherein a width of the base block is larger than a width of the first protrusion and the width of the first protrusion is larger than a width of the second protrusion in radial direction, and wherein the base block has a first supporting surface on a side surface thereof and the first protrusion has a second supporting surface on a side surface thereof, wherein the base block, the first protrusion, and the second protrusion are integrally formed;
a backlight unit disposed on the first supporting surface;
a liquid crystal panel disposed on the second supporting surface; and
a holding component having a first holding part, a second holding part, and a third holding part formed an accommodation space for receiving the plastic frame, the backlight unit, and the liquid crystal panel, wherein the first holding part is bent from one end of the second holding part, and the third holding part is bent from the other end of the second holding part, and wherein a length of the first holding part is smaller than a length the third holding part in axial direction so as to expose the liquid crystal panel, and wherein the first holding part, the second holding part, and the third holding part are integrally formed.

* * * * *